United States Patent
Carleton

[19]

[11] 3,797,522

[45] Mar. 19, 1974

[54] ANTI-KNOCK FLOW VALVE
[75] Inventor: William A. Carleton, Pine City, N.Y.
[73] Assignee: The Bendix Corporation, Southfield, Mich.
[22] Filed: July 27, 1972
[21] Appl. No.: 275,594

Related U.S. Application Data
[63] Continuation of Ser. No. 76,921, Sept. 30, 1970, abandoned.

[52] U.S. Cl. ............................... 137/528, 137/525
[51] Int. Cl. ........................................... F16k 15/14
[58] Field of Search............. 137/525, 525.1, 525.3, 137/528, 533, 533.17, 543.19, 516.25, 516.27, 512.15, 512.4, 515.3, 515.5, 515.7, 543.17, 543.21; 181/47 A, 37 R, 36 R; 417/415, 417, 566; 138/30

[56] References Cited
UNITED STATES PATENTS

| | | | |
|---|---|---|---|
| 535,878 | 3/1895 | Woodward | 137/515.7 |
| 2,474,349 | 6/1949 | Dickey et al. | 417/417 |
| 3,612,105 | 10/1971 | Martin | 138/30 |
| 2,202,123 | 5/1940 | Strode | 137/525 X |
| 3,229,864 | 1/1966 | Roder | 137/525 X |
| 3,386,470 | 6/1968 | Goda et al. | 137/525 X |
| 3,601,151 | 8/1971 | Winnard | 137/525 |
| 2,603,452 | 7/1952 | Spinney | 137/543.19 |
| 3,034,731 | 5/1962 | Chapin | 137/525.1 X |
| 3,159,176 | 12/1964 | Russell et al. | 137/525.3 X |
| 3,250,219 | 5/1966 | McCarty et al. | 417/417 X |
| 3,422,844 | 1/1969 | Grise | 137/525.1 |
| 3,473,561 | 10/1969 | Svenson et al. | 137/525 |
| 3,486,456 | 12/1969 | Hager et al. | 417/417 |

FOREIGN PATENTS OR APPLICATIONS

| | | | |
|---|---|---|---|
| 1,413,224 | 9/1964 | France | 137/525 |

Primary Examiner—William R. Cline
Attorney, Agent, or Firm—Raymond J. Eifler; Bruce A. Yungman

[57] ABSTRACT

An automatic check valve operable to permit flow of a fluid through a passage in one direction and to prevent flow in the opposite direction with means for relieving back pressure is provided. The valve is fabricated from a flexible material and is of unitary design with an expandable tubular body which has a closed upstream end that tapers toward an open circular thick-walled downstream end. The tubular body of the valve expands to absorb shock waves generated by the valve under the influence of back pressure thereby eliminating the noise produced by the sonic hammer effect.

1 Claim, 2 Drawing Figures

PATENTED MAR 19 1974  3,797,522

WILLIAM A. CARLETON
INVENTOR.

BY

ANTI-KNOCK FLOW VALVE

This is a continuation of U.S. Pat. application Ser. No. 76,921, filed Sept. 30, 1970, now abandoned.

FIELD OF THE INVENTION

This invention relates to a check relief valve element and more specifically to a valve element which is adapted for use in the plunger of an electromagnetic pump where it is desired to permit flow of fluid in one direction but to check it in the opposite direction, and where a relief action in said opposite direction must be provided for in the event that the back pressure exceeds a certain value.

BRIEF DESCRIPTION OF THE PRIOR ART

Check valve assemblies incorporating a flexible valve member as the single operating element are generally well known in the art, but their utility has been limited by the physical characteristics of the flexible valve member. A flexible valve member relatively resistant to back pressure can be produced from a relatively hard material and this resistance to back pressure may be increased by adopting a relatively rigid valve member configuration. However, such features result in a flexible valve member not easy to open to permit the flow of fluid in the desired direction, so that it is not suitable for applications in which a large pressure drop across the check valve cannot be tolerated. Also, it has been found that such valves produced from relatively hard material have the objectionable tendency to generate large volumes of noise. A flexible valve member produced from a relatively soft material and a configuration readily deformed will permit the flow of fluid in the desired direction with only a very small pressure drop across the check valve. However, a flexible valve member with such features tends to have a relatively low resistance to back pressure insufficient for many applications.

As the use of electromagnetic plunger pumps to pump fuel has increased in the land vehicle field, it has become more important to increase their delivery and general performance characteristics. To improve delivery, rapid closing spring-loaded check valves have been used. This has produced a side result which is highly undesirable in the automotive application. As pump plunger speeds increase and valve closing times decrease, the pumps have shown the objectionable tendency to generate excessive noise. This noise is produced by the sonic hammer effect in the fuel tank caused by shock waves generated by the valve in the plunger of the pump.

As the use of motorized land vehicles spreads to geographic areas having predictable extremes in weather, it has become increasingly more important to provide a valve for the fuel pump for these vehicles thus insuring a sufficient delivery of fuel at extreme low temperatures.

Known duck bill profiled valves are not capable of efficient cold temperature operation because, in opening, it is required that the valve material at the opening execute a complex motion by changing from a closed slit to an open oval. This requires flexing of the material in at least one direction and stretching of the material in a second direction. This complex motion is greatly impeded at extreme cold temperatures, since valve materials which will freely execute one motion, will not freely execute the other; often at such low temperatures the slot portion of the duck bill valve will remain open regardless of the type of material used in the fabrication of the valve. Furthermore, it has been shown that during normal usage of the duck bill valve, the slot portion will begin to wear and eventually tear, rendering the valve inoperable.

BRIEF SUMMARY OF THE INVENTION

The present invention relates to an automatic check valve operable to permit the flow of a fluid through a passage in one direction and to prevent flow in the other direction, providing simultaneously a back pressure relief means to suppress the noise and vibration of a sonic hammer. The valve is fabricated from a flexible material and is of unitary design with an expandable tubular body which has a closed upstream end that tapers toward an open circular thick-walled downstream end. In the presence of back pressure, the tubular body of the valve expands thereby absorbing the shock waves normally generated.

It is, therefore, an object of this invention to provide a valve for an electromagnetic pump plunger which dampens and suppresses the sonic hammer generated in the fluid being pumped.

Another object of this invention is to provide a valve for an electromagnetic plunger pump capable of operating and pumping fluid in climates having extremely low temperatures.

It is a further object of this invention to provide a valve produced from rubber or a rubber-like material, thereby reducing noise created by the valve's contact with other elements in the valve's environment.

It is still a further object of this invention to provide a valve for the plunger of an electromagnetic pump which is efficient in operation at extremes of temperature and which executes substantially only one form of motion during its operating cycle.

Since vehicle repair in hostile climate conditions is extremely difficult, it is another object of this invention to provide an electromagnetic plunger pump valve which is fabricated in one piece so as to be resistant to frictional wear.

Another object of this invention is the provision of a check valve readily installed in a pipe, channel or other fluid flow conduit and operable in any attitude in which it is disposed to control the flow of a fluid therethrough.

Still another object is the provision of a check valve including a flexible valve member of relatively soft material shaped and supported so that it will withstand a relatively high back pressure.

A further object is the provision of a tubular check valve that operates as a poppet-type valve, which valve is closed at one end, therefore prohibiting fluid from passing through it.

The above and other objects and features of the invention will become apparent from the following detailed description taken in conjunction with the accompanying drawings and claims which form a part of this specification.

DETAILED DESCRIPTION OF THE PREFERRED EMBODIMENT

Figure 1:
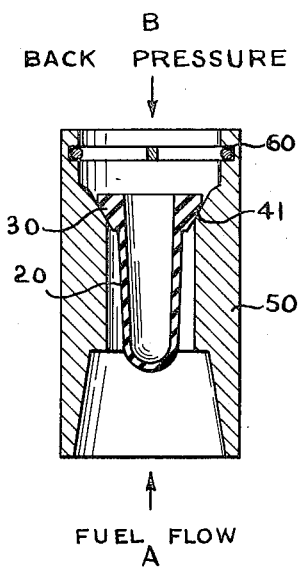
FIG. 1 shows a valve according to the present invention assembled within a typical plunger of an electromagnetic pump.
Figure 2:
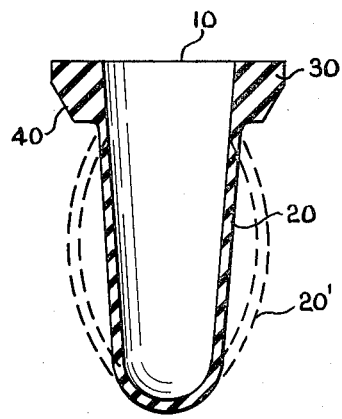
FIG. 2 shows the valve according to the preferred embodiment of the invention in cross-section; the dotted lines indicate the shape of the valve's body when expanded by back pressure.

Referring to the drawings, wherein like reference numerals identify corresponding parts, FIG. 2 shows the preferred embodiment of a check valve according to this invention generally designated by the reference numeral 10. The valve 10 has an elongated tubular body 20 that extends from a closed upstream end toward an open circular thick-walled downstream end 30. End 30 has an annular frustro-conically shaped shoulder or flange 40 which conforms to the valve seat 41 of the electromagnetic pump's plunger 50 shown in FIG. 1. Plunger 50 is similar in design and function to the plunger illustrated in the commonly assigned U. S. Pat. No. 3,486,456; the plunger's method of operation in an electromagnetic pump is explained infra.

The valve 10 is fabricated from a resilient material such as natural or synthetic rubber, neoprene, urethane or the like. The expandable body portion 20 is of relatively uniform thickness, and in the preferred embodiment is tapered outwardly toward the thick end 30. The relative inside and outside diameters of body 20 can be varied to meet the design necessities for any particular application. Under the influence of back pressure, body 20 expands to form the configuration denoted by the dotted lines in FIG. 2, designated by the numeral 20'.

Referring to FIG. 1, the valve 10 is shown assembled to plunger or housing 50 in its off, or non-flow, state. Shoulder 40 is in contactive engagement with valve seat 41. Upon the introduction of fluid into plunger 50 in the direction of arrow A shown in FIG. 1, valve 10 will be forced away from its seat 41 and will thereby allow fluid to flow through plunger 50. A cross-member 60 connected to plunger 50 stops valve 10 from being carried downstream of plunger 50. Cross-member 60 in the commercial embodiment of this invention is a retaining ring having two cross-members resembling an X design; the retaining ring is easily assembled to plunger 50 by compressing it into a slot within plunger 50 after the valve 10 has been set in place. Many different retaining means could be used so long as the flow is not greatly restricted.

When fluid pressure is directed against the open end of valve 10 as indicated by arrow B in FIG. 1 so that it constitutes back pressure, valve 10 is slammed against its valve seat 41. The pressure is evenly distributed on thick-walled end 30 and throughout the conical interior portion of valve 10, thereby creating a tight seal between shoulder 40 and valve seat 41. As the back pressure increases, the tapered wall 20 of valve 10 "balloons" outward; in its expanded state the wall 20 takes on the configuration depicted in FIG. 2 as wall 20'. Thick-walled end 30 of valve 10 serves as a circular hinge for the expandable wall 20. The deformation of wall 20 of valve 10 by this ballooning action demonstrates relatively high resistance to back pressure.

When used inside a plunger of an electromagnetic fuel pump, valve 10 operates as follows. The initial flow of current through the electromagnetic coil will draw the plunger 50 down with respect to FIG. 1 of the drawing. This is the cocking motion and during this downward travel of plunger 50 valve 10 will be displaced from its seat 41 allowing fluid to pass through the bore of plunger 50 filling the space downstream of plunger 50 and above the plunger. When the plunger 50 reaches its extreme downward position, the current to the coil is switched off in the conventional manner, and a spring begins to advance the plunger 50 to its normal at-rest position. In the first instant of upward travel, pressure is rapidly built up in the fluid above the plunger 50. This pressure acts equally on all exposed surfaces, including the thick-walled portion 30 and the conical interior portion of valve 10, thus forcing the valve to rapidly and abruptly close.

Because the valve 10 is an energy absorbing design when the pressure is developed in the fluid by the motion of plunger 50, there is no resultant sonic hammer. When the wall 20 flexes it removes the abrupt shut-off feature common to other valves which are aided in closing by back pressure build-up.

Since the valve 10 is fabricated from a resilient material, any noise that could possibly be generated, for example, by contact with its valve seat 41 or the cross-member 60, is eliminated.

Further, since valve 10 does not have any opening or slit completely traversed by fluid flow, there is no possibility of eventual frictional wearing which would cause the valve to tear, rendering it inoperative. Equally important, a valve according to this invention will operate even under extreme low temperatures, that is, since valve 10 operates as a poppet-type valve, even if the valve becomes stiff at a low temperature it will continue to meet the requirements of its primary function.

An alternate embodiment of this invention could include a reinforcing member, e.g., a ring of metal or plastic molded to the inside diameter of thick-walled end 30 of valve 10, for applications where extremely high back pressures are contemplated; the reinforcing member would prevent the valve from being pushed through its valve seat.

Since the showing of the drawings is exemplary only, no limitations are to be applied in the claims other than those specifically set forth therein.

I claim:

1. A valve for unidirectional flow of fuel therethrough, said valve comprising:

a housing having an axial bore therethrough adapted to pass pressurized fluid therethrough in only one direction, said bore having a first passage portion of radial cross-sectional area A; a second passage portion having a radial cross-sectional area B, which is larger than A; and an annular shoulder between said first and second passage portions, at least a portion of said shoulder forming an annular valve seat;

a hollow valve element slideably mounted in said bore, said valve element having an axially extending tubular body that includes a substantially non-expandable open end portion disposed in said second passage portion having a radial cross-sectional area C, which is less than B, but larger than A, the periphery of said open end portion of said valve element having an annular configuration that is the same as the valve seat in said housing bore and which is sized to engage the annular valve seat when said valve element moves in a direction towards said first passage portion; and a closed end portion, a portion of which extends into said first passage portion, having a radial cross-sectional area D, which is less than A, the closed end portion comprised of a resiliently expandable material so that said closed portion expands when subjected to pressure internal thereof; and stop means axially spaced from the annular shoulder in said housing bore for stopping further movement of the open end portion of said valve element within said second passage when said valve element moves in a direction away from said first passage portion, thereby allowing the periphery of said open end portion to disengage from the valve seat, whereby when the open end portion of said hollow valve element is disengaged from said valve seat fluid may pass from said first passage and through said second passage but when fluid attempts to flow in the reverse direction, the open portion of the valve element moves in the direction of the first passage and the periphery thereof engages the valve seat to prevent further flow while the resiliently deformable closed end portion of said valve element expands momentarily to absorb the transient pressure differential across the valve element when said valve element engages said valve seat.

* * * * *